(12) United States Patent
Lucic et al.

(10) Patent No.: US 9,759,236 B2
(45) Date of Patent: Sep. 12, 2017

(54) INLET TUBE DESIGN

(71) Applicant: Hamilton Sundstrand Corporation, Windsor Locks, CT (US)

(72) Inventors: Milan Lucic, East Windsor, CT (US); John M. Beck, Windsor, CT (US); Paul E. Hamel, Enfield, CT (US); Robert Telakowski, Fair Lawn, NJ (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 483 days.

(21) Appl. No.: 14/261,905

(22) Filed: Apr. 25, 2014

(65) Prior Publication Data
US 2015/0308460 A1   Oct. 29, 2015

(51) Int. Cl.
| F04D 29/70 | (2006.01) |
| F04D 29/58 | (2006.01) |
| B64D 13/00 | (2006.01) |
| F04D 19/00 | (2006.01) |
| F04D 25/06 | (2006.01) |
| B64D 13/06 | (2006.01) |

(52) U.S. Cl.
CPC .......... *F04D 29/703* (2013.01); *B64D 13/00* (2013.01); *B64D 13/06* (2013.01); *F04D 19/00* (2013.01); *F04D 25/06* (2013.01); *F04D 29/5806* (2013.01); *F04D 29/701* (2013.01); *B64D 2013/0618* (2013.01); *B64D 2013/0651* (2013.01); *Y02T 50/56* (2013.01); *Y10T 403/25* (2015.01)

(58) Field of Classification Search
CPC  B64D 13/00; B64D 13/06; B64D 2013/0618; B64D 2013/0651; F04D 19/002; F04D 29/5806; F04D 29/584; F04D 29/703; Y02T 50/56; Y10T 403/25; Y10T 403/32098
USPC ...................................... 403/34, 64
See application file for complete search history.

(56) References Cited

U.S. PATENT DOCUMENTS

| 2,401,584 A * | 6/1946 | Rhines ............... B64D 33/08 123/41.56 |
| 3,825,212 A * | 7/1974 | Darges ............... B64D 13/08 236/13 |
| 6,592,078 B2 * | 7/2003 | Porte ............... B64D 15/04 244/134 B |
| 7,017,706 B2 * | 3/2006 | Brown ............... F01D 25/30 181/222 |
| 7,342,332 B2 | 3/2008 | McAuliffe et al. |

(Continued)

FOREIGN PATENT DOCUMENTS

| EP | 2617648 A1 | 7/2013 |
| EP | 2677140 A2 | 12/2013 |
| GB | 1201096 | 8/1970 |

OTHER PUBLICATIONS

Extended European Search Report from EP Application No. 15165147.8, Dated Sep. 9, 2014, 6 pages.

*Primary Examiner* — Josh Skroupa
(74) *Attorney, Agent, or Firm* — Kinney & Lange, P.A.

(57) ABSTRACT

A ram air fan assembly includes an outer housing. An inner housing is located within the outer housing. A motor is attached to the inner housing. An inlet tube extends between the outer housing and the motor. The inlet tube includes a straight first portion and a curved second portion. At least one of the two portions includes a perforated portion.

6 Claims, 3 Drawing Sheets

(56) References Cited

U.S. PATENT DOCUMENTS

| | | |
|---|---|---|
| 7,394,174 B2 | 7/2008 | Blase et al. |
| 7,757,502 B2 | 7/2010 | Merritt et al. |
| 8,276,398 B2 * | 10/2012 | Grabon .................. F25B 43/02 62/296 |
| 2006/0162298 A1 * | 7/2006 | Oh ........................ A47L 7/0004 55/337 |
| 2012/0014784 A1 * | 1/2012 | Hipsky .................. B64D 13/00 415/177 |
| 2013/0022443 A1 * | 1/2013 | Beers .................... B64D 33/08 415/1 |
| 2013/0180220 A1 | 7/2013 | McAuliffe et al. |

* cited by examiner

INLET TUBE DESIGN

BACKGROUND

The present invention relates to a ram air fan assembly. In particular, the invention relates to an inlet tube for a ram air fan assembly of an aircraft.

The environmental control system ("ECS"), including the ram air fan assembly, aboard an aircraft provides conditioned air to an aircraft cabin. Conditioned air is air at a desired temperature, pressure, and humidity for aircraft passenger comfort. Compressing ambient air at flight altitude heats the resulting pressurized air sufficiently that it must be cooled, even if the ambient air temperature is very low. Thus, under most conditions, heat must be removed from air by the ECS before the air is delivered to the aircraft cabin. As heat is removed from the air, it is dissipated by the ECS into a separate stream of air that flows into the ECS, across heat exchangers in the ECS, and out of the aircraft, carrying the excess heat with it. Under conditions where the aircraft is moving fast enough, the pressure of air ramming into the aircraft is sufficient to move enough air through the ECS and over the heat exchangers to remove the excess heat.

While ram air works well under normal flight conditions, at lower flight speeds, or when the aircraft is on the ground, ram air pressure is too low to provide enough air flow across the heat exchangers for sufficient heat removal from the ECS.

Typically, ram air fan assemblies utilize an electric motor to drive the fan. This is accomplished by a rotor assembly, which is driven by a stator. The stator generates a significant amount of heat as a byproduct of the magnetic field used to drive the rotor assembly. Additionally, bearings that support the rotor assembly typically produce heat, and therefore, require cooling. As a result of these sources of heat, the electric motor must be cooled by sources such as external air. Thus, air is provided to the stator and bearings of the ram air fan along one or more flow paths from upstream or downstream of the ram air fan in the ECS.

Due to the collection inlet(s) location in the ECS (and the aircraft) adjacent the ram air fan assembly, the collection inlet(s) for cooling air are exposed to a high volume of particulate (such as dirt) during operation, which can result in foreign object damage ("FOD"). Thus, it is desirable to reduce the amount of particulate that reaches those components. Unfortunately, previous particle separators are ineffective at removing particulate from cooling air as previous particle separators require a high velocity clean airstream, which may not be available at the ram air fan and the area there around. As a result, previous particle separators are subject to problems such as clogging or operate in an undesirable manner by introducing particle laden cooling air to interior components of the ram air fan.

SUMMARY

A ram air fan assembly includes an outer housing. An inner housing is located within the outer housing. A motor is attached to the inner housing. An inlet tube extends between the outer housing and the motor. The inlet tube includes a straight first portion and a curved second portion. At least one of the two portions includes a perforated portion.

A method of filtration for use in a ram air fan assembly includes perforating a portion of an inlet tube with a plurality of perforations. A fan case is fluidly connected to a motor. Air flow is drawn through the inlet tube. A suction force of the air flow is then spread across the perforated portion and a first end of the inlet tube.

DETAILED DESCRIPTION

The present invention relates to a ram air fan assembly. In particular, the invention relates to an inlet tube for a ram air fan assembly of an aircraft.

The inlet tube, or J-Tube, effectively separates particulates such as dirt from turbulent air flow passing adjacent the ram air fan and supplies a flow of substantially clean cooling air to a motor stator and journal bearings. The cooling passages are sized to operating conditions and application specific parameters to draw air therein while leaving particulate such as dirt to pass over the air inlet of the outer housing without entering the J-Tube. Once in the inner housing, the clean air flow passes through several elbow turns inside the inner housing before connecting by a duct, hose, or similar passage to the ram air fan. In the ram air fan assembly, the clean cooling air flow is introduced by conventional means across the motor stator and the bearings. The perforated J-Tube is advantageous because the unit can be positioned in particle laden airflow and is able to achieve separation of unwanted particles without experiencing negative side effects such as plugging or introducing particle laden air to undesirable locations.

Figure 1:
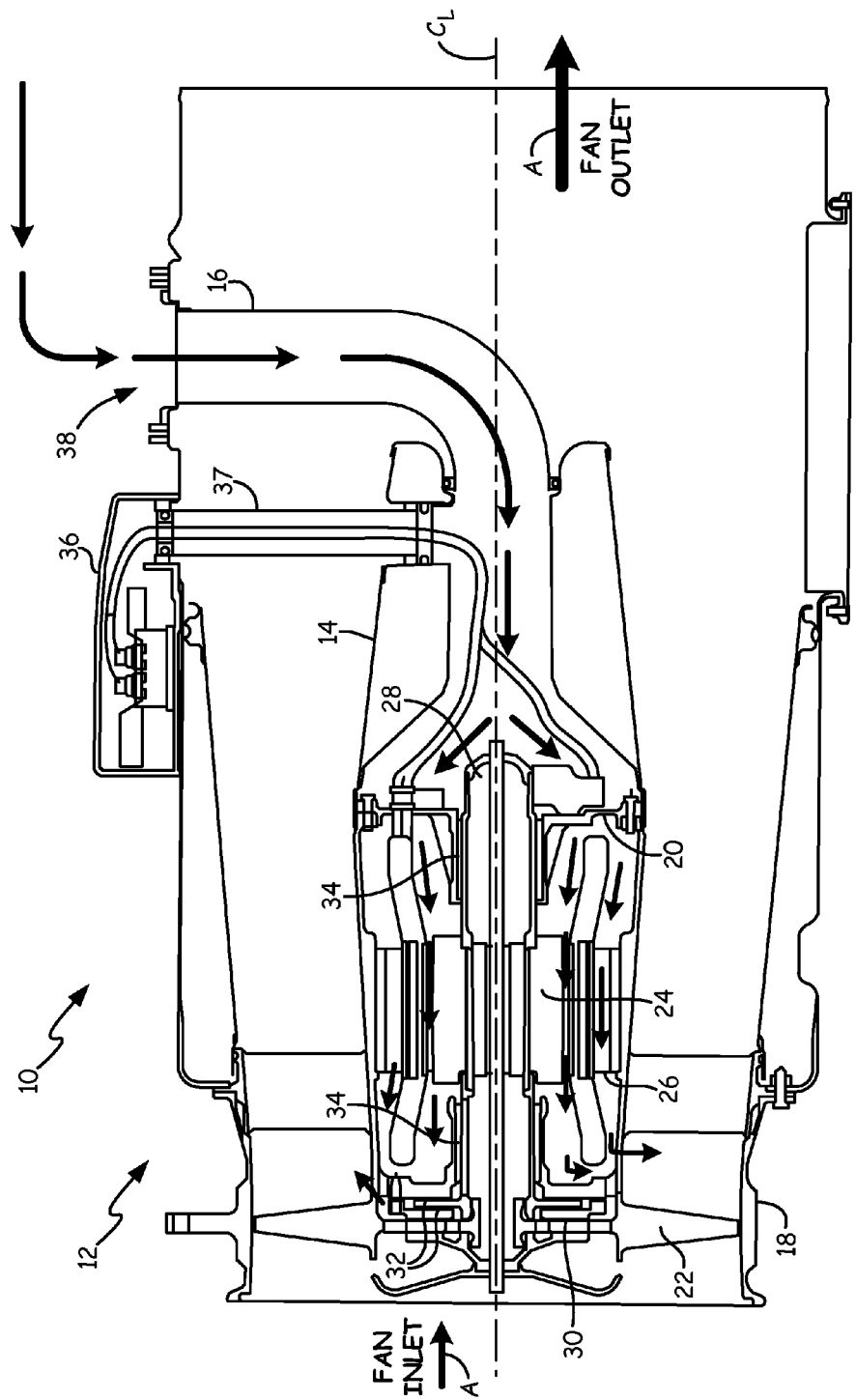
FIG. 1 is a cross-sectional view of a ram air fan assembly.

FIG. 1 shows a cross-section of ram air fan assembly 12 located within ECS 10. Ram air fan assembly 12 includes inner housing 14, inlet tube 16, outer housing 18, bearing housing 20, fan rotor 22, motor rotor 24, motor stator 26, shaft 28, thrust plates 30, thrust bearings 32, journal bearings 34, terminal box 36, wire transfer tube 37, and inlet 38.

Outer housing 18 surrounds and encompasses bearing housing 20 and inner housing 14. Outer housing 18 is attached to inner housing 14 at fan struts. Bearing housing 20 is attached to inner housing 14 with bolts. Fan rotor 22 extends radially with respect to centerline $C_L$ from shaft 28 to adjacent outer housing 18 forward of bearing housing 20 and inner housing 14. In particular, fan rotor 22 is attached to shaft 28 by conventional means such as a tie rod (not numbered).

Motor rotor 24 and motor stator 26 are disposed within bearing housing 20 and inner housing 14. In the embodiment shown, motor rotor 24 is contained within motor stator 26 and connects to shaft 28. Together, motor rotor 24 and shaft 28 define an axis of rotation for ram air fan assembly 12.

Thrust plate 32 and inner housing 14 contain a flange extension of shaft 28, with thrust bearings 32 positioned between the flange extension of shaft 28 and thrust plate 32; and between the flange-like portion of shaft 28 and inner housing 14. Journal bearings 34 are disposed aft of thrust plate 32 and thrust bearings 32 and are positioned between shaft 28 and bearing housing 20. Additionally, journal bearings 34 are disposed along aft portion of shaft 28.

Terminal box 36 is disposed in outer housing 18 and electronics such as wires are run to inner housing 14 by wire transfer tube 37. Outer housing 18 also contains inlet 38 which communicates with inner housing 14 via inlet tube 16. As is illustrated in FIG. 1 with arrows A, cooling air flows from outer housing 18 to inner housing 14 through inlet 38, inlet tube 16, and additional ducts (not shown). Inlet 38 at the end of inlet tube 16 is approximately 2.0-3.0 inches in diameter.

In the embodiment shown in FIG. 1, inlet tube 16 is positioned downstream of fan rotor 22 (as defined by the direction of air flow with arrows A). The relative positioning of inlet tube 16 relative to the orientation of ram air fan assembly 12 is variable and is dictated by operational specific criteria such as volume and velocity of air flow, estimated particle content, operational speeds of ram air fan, altitude, etc. Commercially available computational fluid dynamics software is available to aid in optimizing criteria such as the geometry and positioning of inlet tube 16 given operational criteria.

Inlet tube 16 generally contains a shape resembling the letter J, and is often referred to as a J-Tube. Inlet tube 16 may also include other serpentine shapes which can include more than a single bend of 90 degrees.

In operation, ram air fan assembly 12 is installed into ECS 10 aboard an aircraft and is connected to the fan inlet, the bypass inlet, and the fan outlet. When the aircraft does not move fast enough to generate sufficient ram air pressure to meet the cooling needs of ECS 10, power is supplied to motor stator 26 to energize motor stator 26. This causes motor rotor 24 to rotate about the axis of rotation for ram air fan assembly 12, rotating connected shaft 28 and fan rotor 22. Journal bearings 34 and thrust bearings 32 provide low friction support for the rotating components. As fan rotor 22 rotates, it moves air in a downstream direction from the fan inlet, through outer housing 18 to the fan outlet.

Components within bearing housing 20 and inner housing 14, including thrust bearings 32, journal bearings 34, motor stator 26, and motor rotor 24. These components generate significant heat and must be cooled during operation. As previously discussed and illustrated in FIG. 1, cooling air is provided to flow across thrust bearings 32, journal bearings 34, motor stator 26, and motor rotor 24 and accomplish cooling. In particular, cooling air flows from outer housing 18 to inner housing 14 through inlet 38, inlet tube 16 and additional ducts or passages (not shown). Once the cooling air has passed across thrust bearings 32, journal bearings 34, motor stator 26, and motor rotor 24 the air flow exits inner housing 14.

Figure 2A:
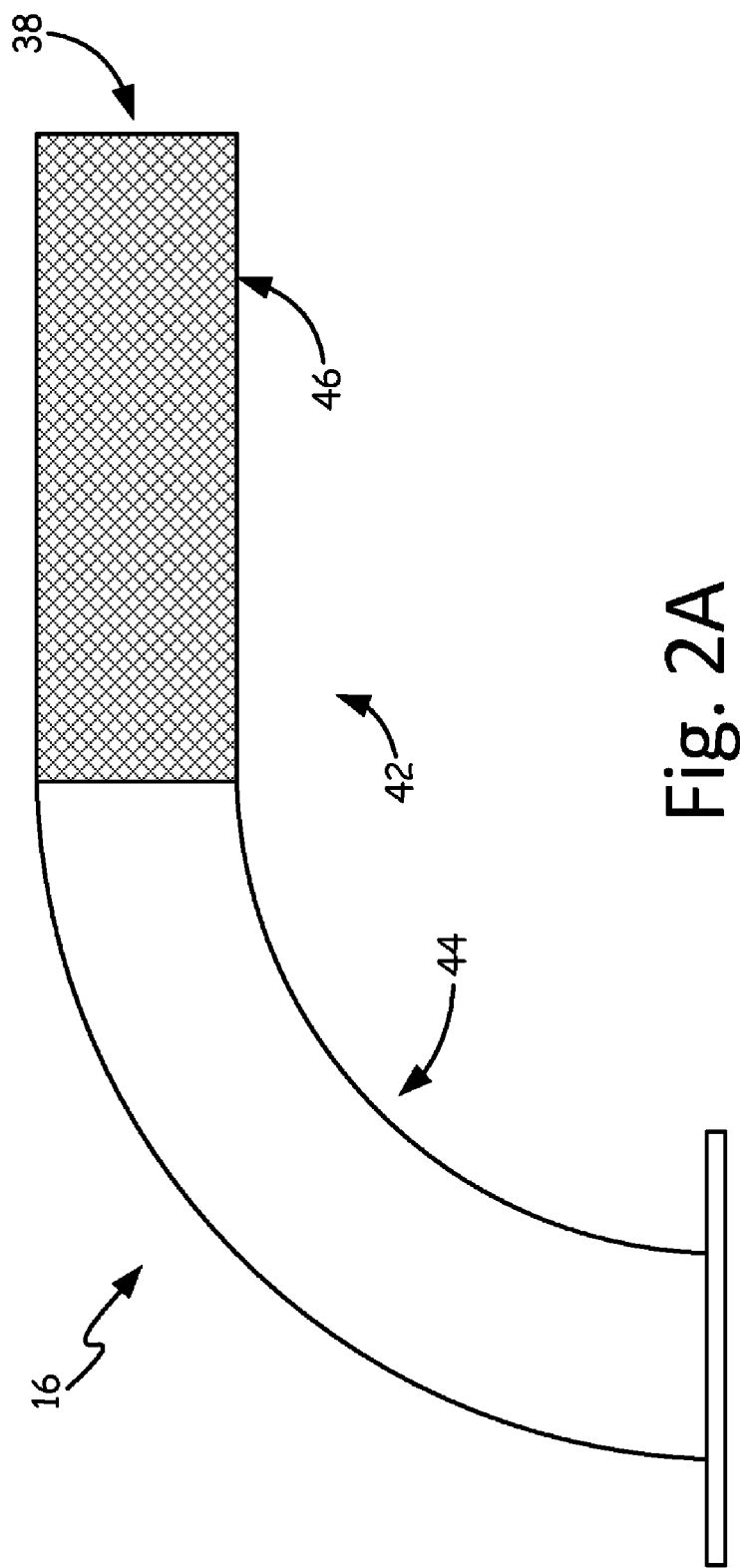
FIG. 2 is a side elevation view of a j-tube of the ram air fan assembly.
Figure 2B:
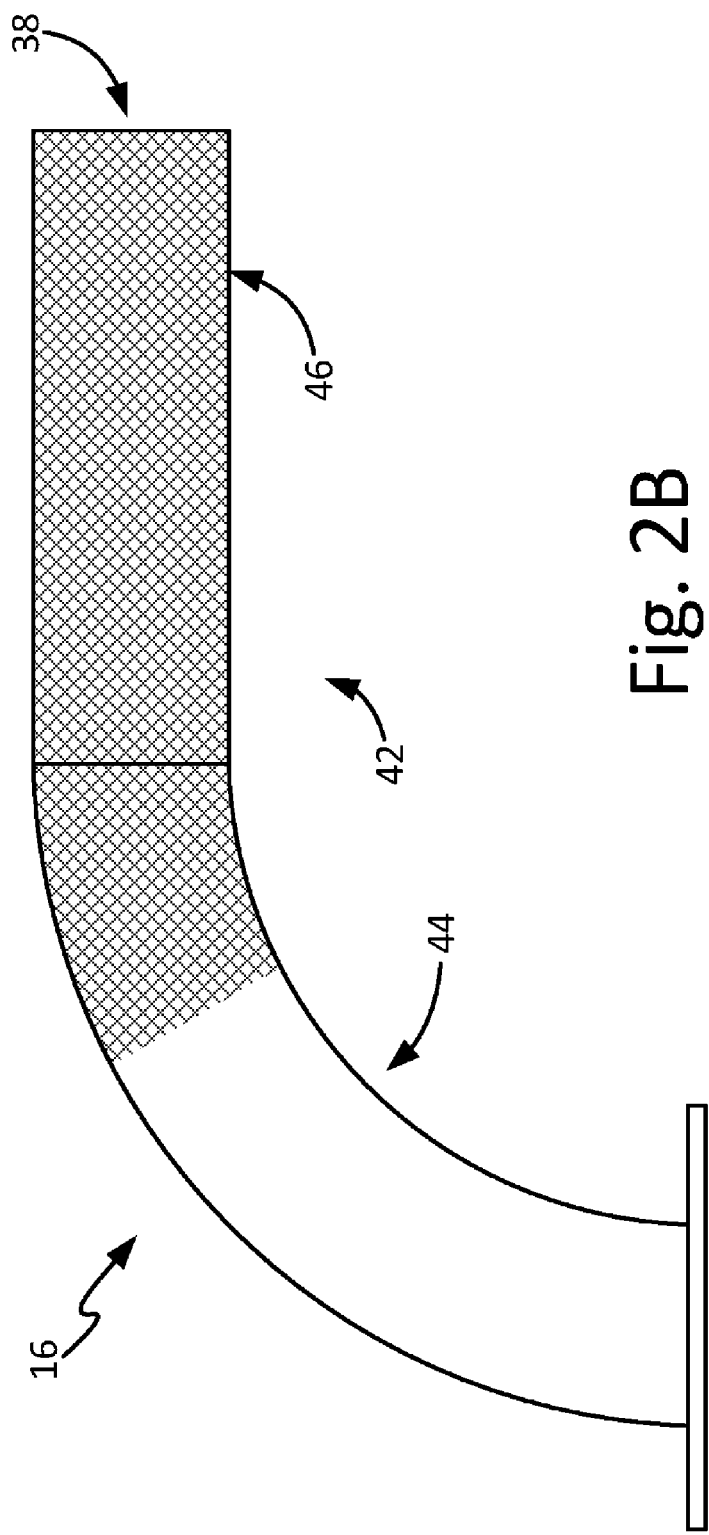

FIGS. 2A and 2B show a side elevation views of inlet tube 16 of ram air fan assembly 12. Inlet tube 16 includes first portion 42 and second portion 44. First portion 42 includes perforated portion 46. The shape of first portion 42 includes a straight tubular shape. The shape of second portion 44 includes a curved tubular shape.

Perforated portion 46 includes a plurality of perforations. Each of the plurality of perforations can have a diameter of approximately 0.1-0.2 inches. The shape of each of the plurality of perforations may include circular, hexagonal, elliptical, parallelogram, or other various uniform and non-uniform openings. The plurality of perforations on perforated portion 46 allow for the same amount of air flow to enter into inlet tube 16, but a suction force of the air flow is spread through all of the perforations and inlet 38 at the end of inlet tube 16. This spreading out of the air flow suction force decreases the amount of force experience by foreign objects passing by inlet 38. This significantly reduces the likelihood of foreign objects getting drawn into inlet tube 16 when the air flow enters ram air fan assembly 12.

Perforated portion 46 may extend the entire length of first portion 42. Alternatively, perforated portion 46 may extend along first portion 42 for a distance less than the entire length of first portion 42. As shown in FIG. 2B, perforated portion 46 may also extend into second portion 44.

Perforated portion 46 allows for air to be drawn into inlet tube 16 from not only the end of inlet tube 16, but also from inside fan outer housing 18. Drawing air from within fan outer housing 18 reduces the suction force of an inlet air flow that enters inlet 38. The reduction in the suction force of the inlet air flow also reduces the suction force experienced by FOD particles present in the air flow, therefore reducing the amount of FOD particles ingested into inlet 38. An unperforated inlet tube creates a high suction force on the air flow entering the inlet. Any air flow entering into an engine through an unperforated inlet tube would contain a higher amount of FOD particle than a perforated inlet tube, i.e. inlet tube 16, because the FOD particles would be subjected to a higher suction force drawing the FOD particles into inlet 38. The perforations of perforated portion 46 are unique in that they reduce suction pressures in the open end of inlet tube 16, lessening the vacuuming effects of inlet 38 drawing swirling FOD into inlet 38.

The plurality of perforations in perforated portion 46 also acts as a filtration for light FOD particulates in the stream of airflow that enters ram air fan assembly 12. The rate of air flow also increases with the presence of perforated portion 46 which provides more air flow to cool thrust bearings 32, journal bearings 34, motor stator 26, and motor rotor 24. Straight portion 42 extends approximately between 6.0-7.0 inches. The perforations of perforated portion 46 are sized and positioned so as not to receive particles from air flow passing through inlet tube 16 such that only substantially clean air flow enters outer housing 18 for cooling purposes.

Discussion of Possible Embodiments

The following are non-exclusive descriptions of possible embodiments of the present invention.

A ram air fan assembly includes an inner housing located within an outer housing. A motor is attached to the inner housing. An inlet tube extends between the outer housing and the motor. The inlet tube includes at least a straight first portion and a second curved portion. At least one of the straight first portion and the second curved portion includes a perforated portion.

The ram air fan assembly of the preceding paragraph can optionally include, additionally and/or alternatively, any one or more of the following features, configurations and/or additional components:

the perforated portion may comprise a plurality of uniformly spaced perforations;

each of the uniformly spaced perforations perforation may have a diameter of between about 0.1 and 0.2 inches (0.254 cm and 0.508 cm);

the perforated portion is may be disposed along the entire length of the straight first portion of the inlet tube;

the perforated portion may be disposed along at least half of the length of the straight first portion of the inlet tube;

the perforated portion may be disposed along at least a portion of the curved second portion of the inlet tube;

the inlet tube may have a diameter of between about 2.0 and 3.0 inches (5.08 cm and 7.62 cm);

a ratio of the inlet tube diameter to the diameter of each the perforations may be between 0.03 and 0.1;

a perforated portion may be disposed along the straight first portion of inlet tube; and the perforations are configured to allow a suction force of air to be spread across the plurality of perforations and a first end of the inlet tube.

A method of filtration for use in a ram air fan assembly, the method may include perforating a portion of an inlet tube with a plurality of perforations, fluidly connecting a fan case with a motor with the inlet tube, drawing an air flow through the inlet tube and spreading a suction force of the air flow across the perforated portion and a first end of the inlet tube.

A further embodiment of any of the foregoing method, wherein:

the air flow entering the inlet tube may be decreased;

an amount of foreign object ingestion into the inlet tube may be prevented;

the inlet tube may include a first straight portion and a second curved portion, and perforating the inlet tube may include creating perforations along an entire first straight portion of the inlet tube;

the inlet tube may include a first straight portion and a second curved portion, and perforating the inlet tube may include creating perforations along at least half of the straight first portion of the inlet tube; and the inlet tube may include a first straight portion and a second curved portion, and perforating the inlet tube may include creating perforations along at least a portion of the curved second portion of the inlet tube.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ram air fan assembly comprising:
an outer housing;
an inner housing located within the outer housing;
a motor attached to the inner housing; and
an inlet tube configured to pull in ambient air, the inlet tube defining a portion of a flowpath leading to a downstream end of the inner housing and such that the inlet tube is fluidly connected to a downstream end of the motor, wherein the inlet tube includes at least a straight first portion and a curved second portion, wherein the straight first portion and the curved second portion include a perforated portion with uniformly spaced perforations, wherein the perforated portion is fluidly connected to air within the outer housing.

2. The ram air fan assembly of claim 1, wherein each of the uniformly spaced perforations has a diameter of between about 0,1 and 0.2 inches (0.254 cm. and 0.508 cm).

3. The ram air fan assembly of claim 1, wherein the perforated portion is disposed along at least a portion of the curved second portion of the inlet tube.

4. The ram air fan assembly of claim 1, wherein the inlet tube has a diameter of between about 2.0 and 3.0 inches (5.08 cm and 7.62 cm).

5. The ram air fan assembly of claim 1, wherein a ratio of the inlet tube diameter to the diameter of each the perforations is between 0.03 and 0.1.

6. The ram air fan assembly of claim 1, wherein the perforations are configured to allow a suction force of air to be spread across the plurality of perforations and a first end of the inlet tube.

* * * * *